Figure 1:
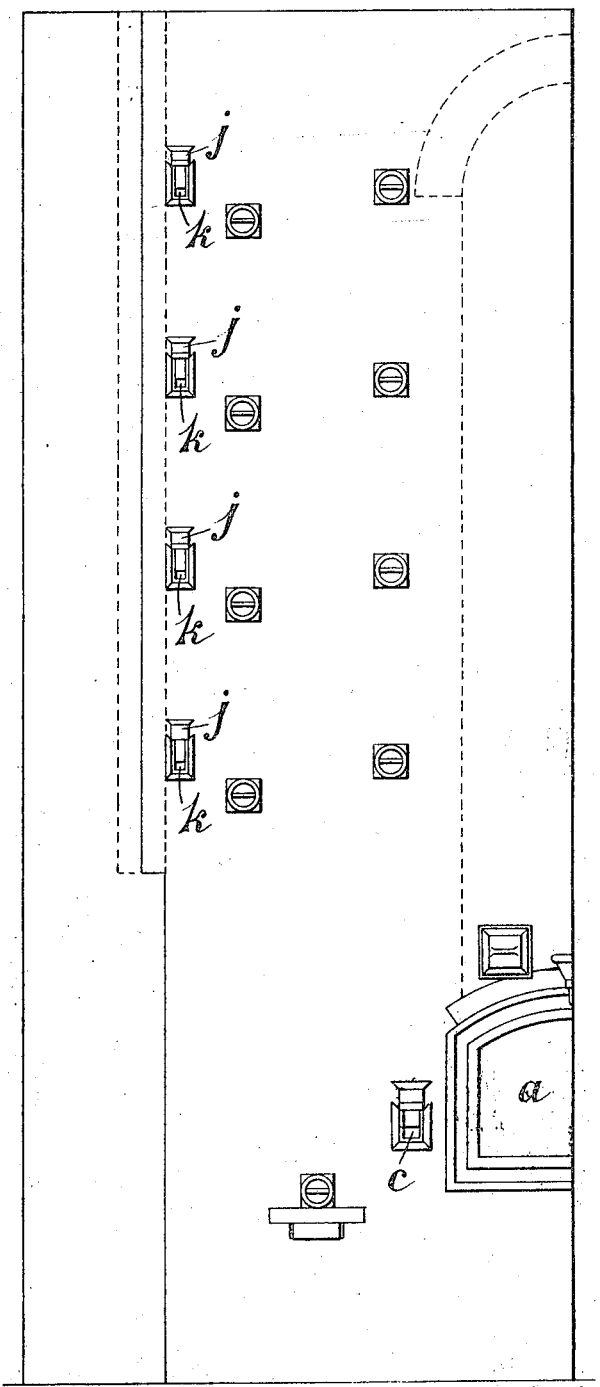

R. M. BROOKE.
GAS RETORT FURNACE.
APPLICATION FILED MAR. 19, 1909.

949,674.

Patented Feb. 15, 1910.
9 SHEETS—SHEET 1.

R. M. BROOKE.
GAS RETORT FURNACE.
APPLICATION FILED MAR. 19, 1909.

949,674.

Patented Feb. 15, 1910.
9 SHEETS—SHEET 3.

Witnesses.
W. Allen
L. B. Middleton

Inventor.
Reuben M. Brooke
by Herbert W. T. Jenner.
Attorney.

R. M. BROOKE.
GAS RETORT FURNACE.
APPLICATION FILED MAR. 19, 1909.

949,674.

Patented Feb. 15, 1910.
9 SHEETS—SHEET 5.

R. M. BROOKE.
GAS RETORT FURNACE.
APPLICATION FILED MAR. 19, 1909.

949,674.

Patented Feb. 15, 1910.
9 SHEETS—SHEET 8.

Witnesses:
W. Allen
S. B. Middleton

Inventor
Reuben M. Brooke
by Herbert W. Jenner.
Attorney

R. M. BROOKE.
GAS RETORT FURNACE.
APPLICATION FILED MAR. 19, 1909.

949,674.

Patented Feb. 15, 1910.
9 SHEETS—SHEET 9.

UNITED STATES PATENT OFFICE.

REUBEN MITCHELL BROOKE, OF WEST VALE, NEAR HALIFAX, ENGLAND, ASSIGNOR TO ROBERT DEMPSTER & SONS, LIMITED, OF ELLAND, ENGLAND.

GAS-RETORT FURNACE.

949,674.  Specification of Letters Patent.  Patented Feb. 15, 1910.

Application filed March 19, 1909. Serial No. 484,495.

*To all whom it may concern:*

Be it known that I, REUBEN MITCHELL BROOKE, residing at Gladstone House, Rochdale Road, West Vale, near Halifax, in the county of York, England, have invented certain new and useful Improvements in Gas-Retort Furnaces; and I do hereby declare the following to be a full, clear, and exact description of the invention, such as will enable others skilled in the art to which it appertains to make and use the same.

This invention relates to the heating of vertical retorts used in the manufacture of gas or coke and for like purposes, its object being to provide that the heat applied to each of the heating chambers or compartments into which the setting is usually divided, and the draft upon each of such compartments, shall be capable of separate regulation.

For regulating the draft upon the different compartments (as dampers close to the compartments—that is between the compartments and the regenerator—would be liable to become immovable in consequence of the heat to which they would be exposed) I divide the regenerator into separate units, one for each compartment, and regulate by suitable dampers at the outlets of each of the regenerators the proportionate draft upon each compartment, the general draft upon the setting being regulated by a main damper controlling the common outlet from all the regenerators to the chimney. These dampers are therefore only exposed to the waste gases after a portion of the heat thereof has been imparted to the secondary air in passing through the regenerators.

In a vertical combustion chamber, it is conceivable that the tendency of the hot gases to rise might cause the upper compartments of the setting to receive an undue proportion of such gases; but the regulated draft upon each compartment is designed to prevent this. Otherwise any of the following arrangements might be employed:—(1) The supplies of producer gas and secondary air opposite the upper compartment or compartments might be reduced in order to compensate for the surplus rising from lower levels. (2) The said supplies might be reduced at the lower compartments, giving a reduced pressure or partial vacuum, inducing a down-draft which would oppose such upward tendency; or the equivalent might be adopted of increasing the chimney draft on the lower compartments. (3) The openings from the combustion chamber into the several compartments of the setting may be of different sizes, as for instance, they may be smaller for the upper compartment or compartments, relatively to those leading into the lower compartments. (4) The combustion chamber might be divided into a number of separate combustion chambers, one opposite each compartment of the setting; or the combustion chamber may be divided into two or more parts each part being common to several heating compartments. (5) The chamber may be provided with baffles forming any desired number of sub-chambers having communications with each other, the baffles however preventing the formation of a definite upward current; this latter arrangement I at present consider preferable, and have herein illustrated.

In the accompanying drawings, Sheets 1 to 5 illustrate by way of example the application of my invention to a bed of 10 retorts, but I do not limit myself to the exact arrangements shown, as the paths of the heating gases may be modified; Sheet 6 relates to a bed of 6 retorts, and Sheets 7, 8 and 9 to a bed of 2 retorts.

Figure 2:
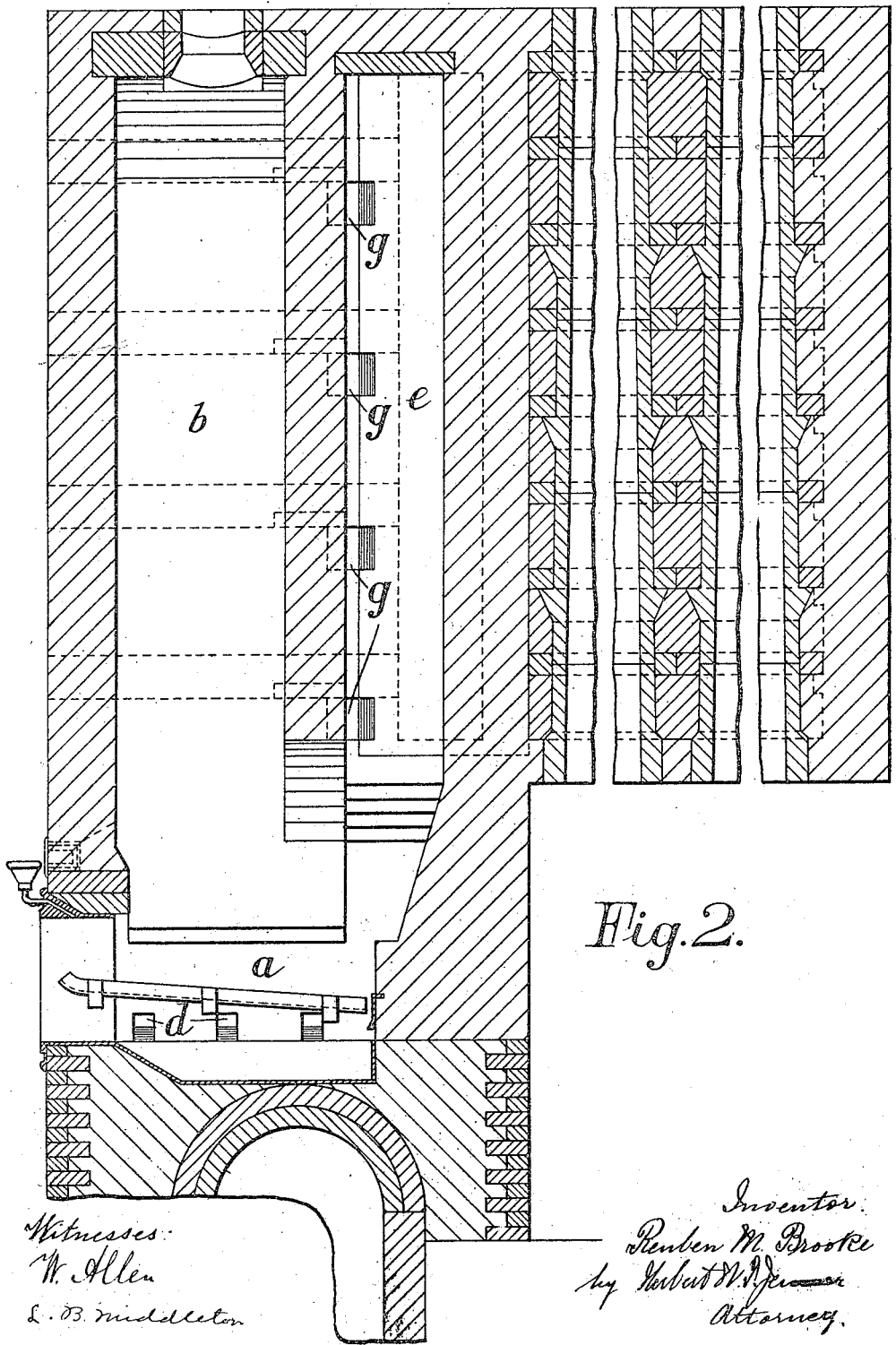
Figure 3:
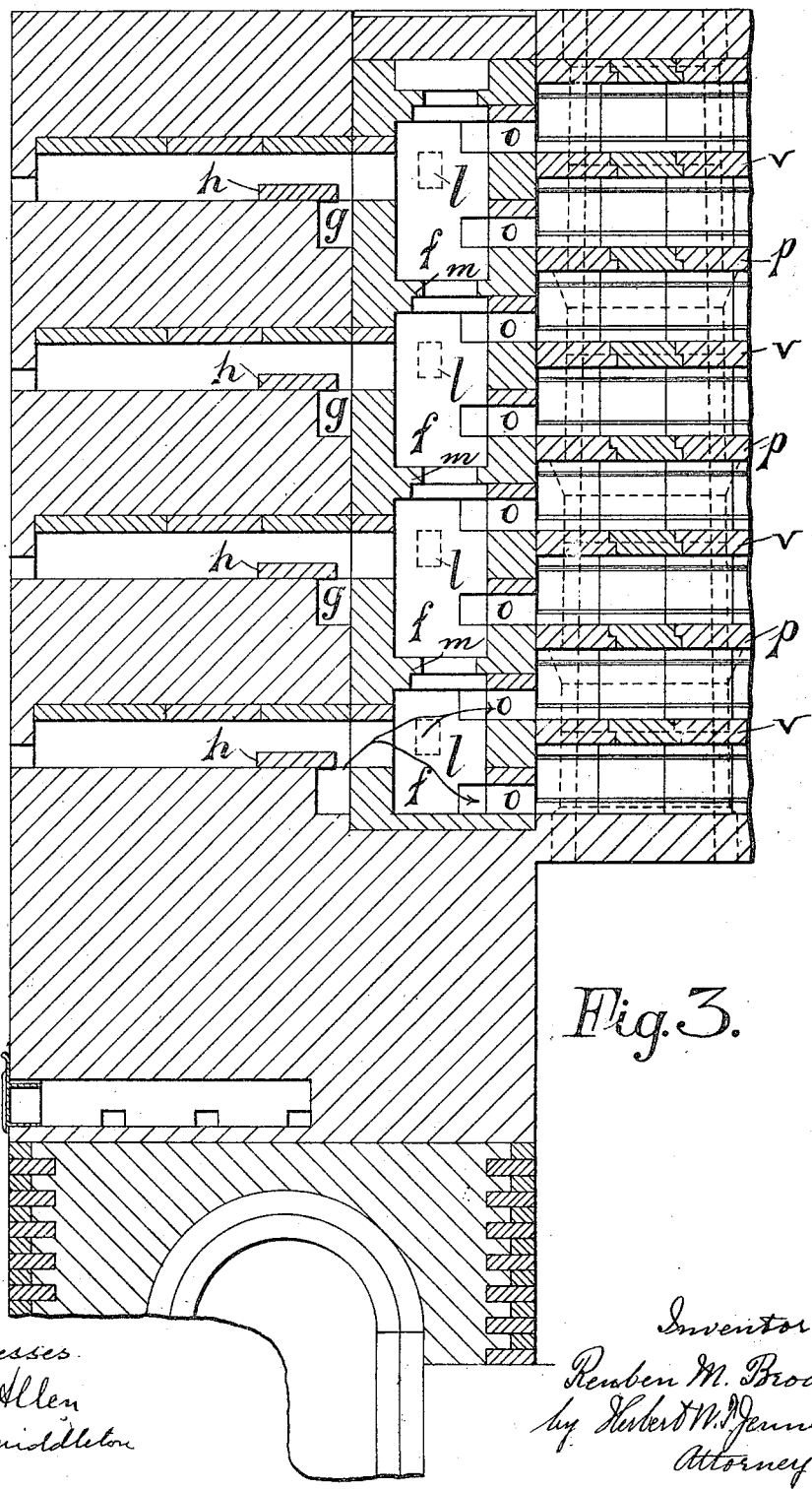
Figure 4:
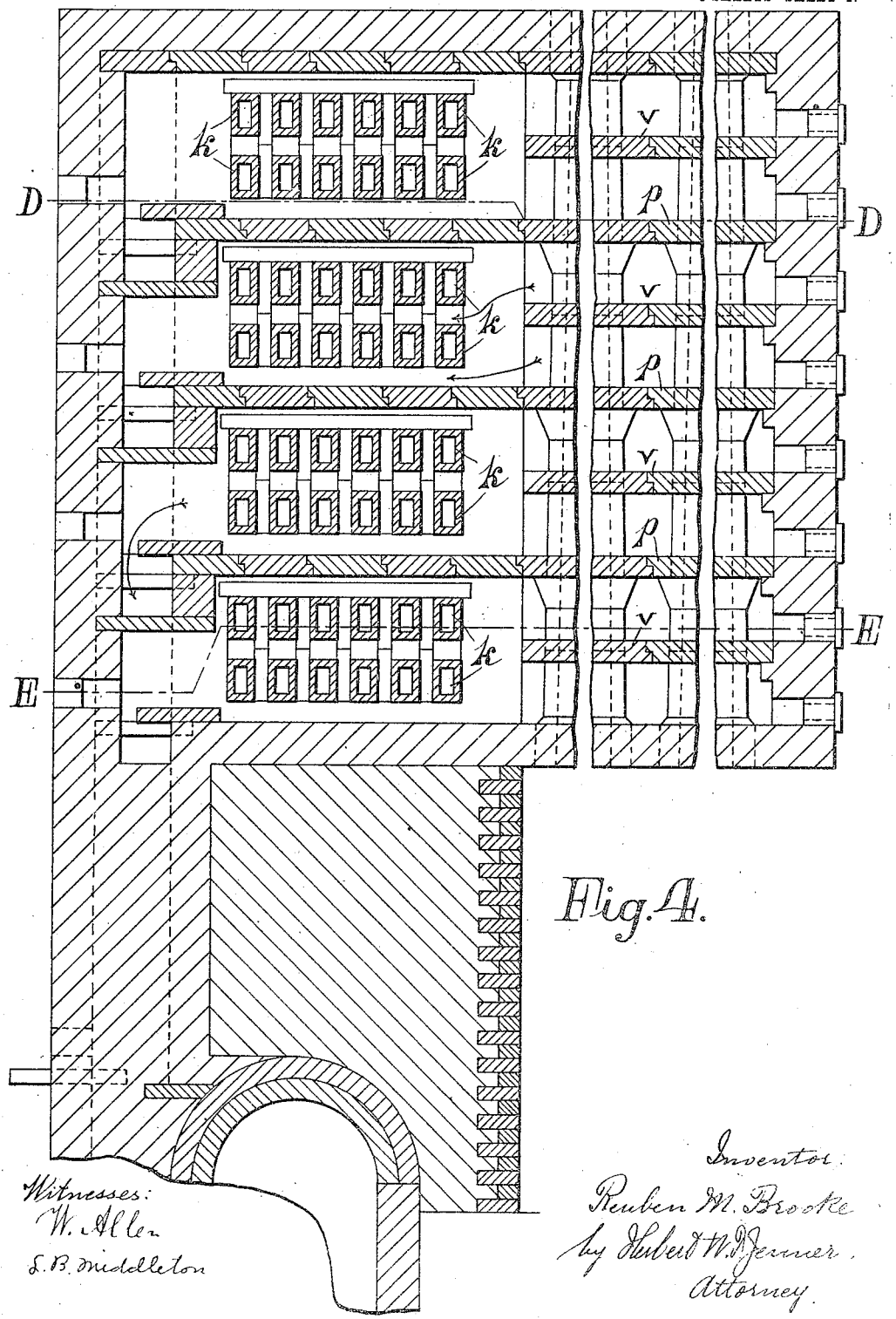
Figure 5:
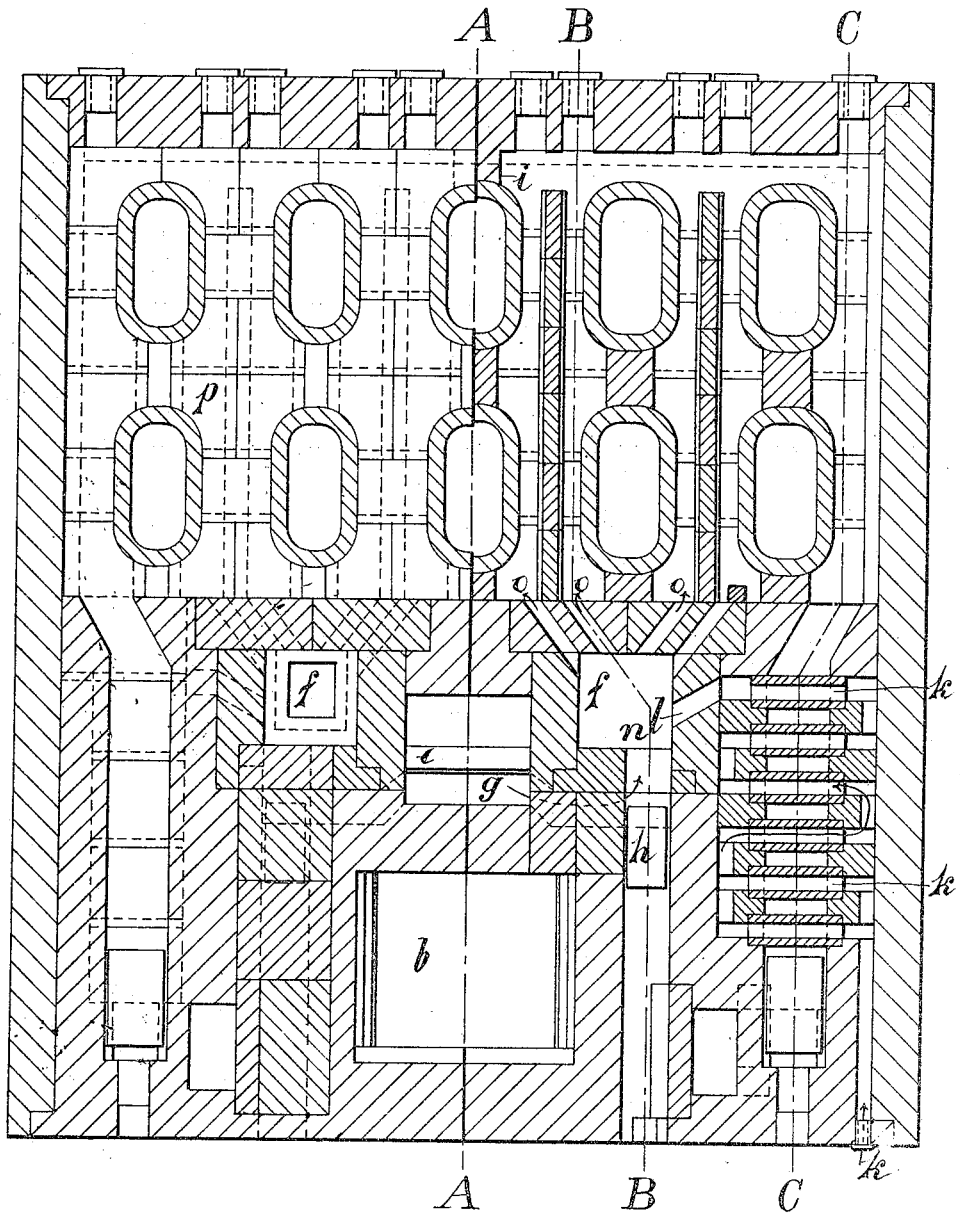
Figure 6:
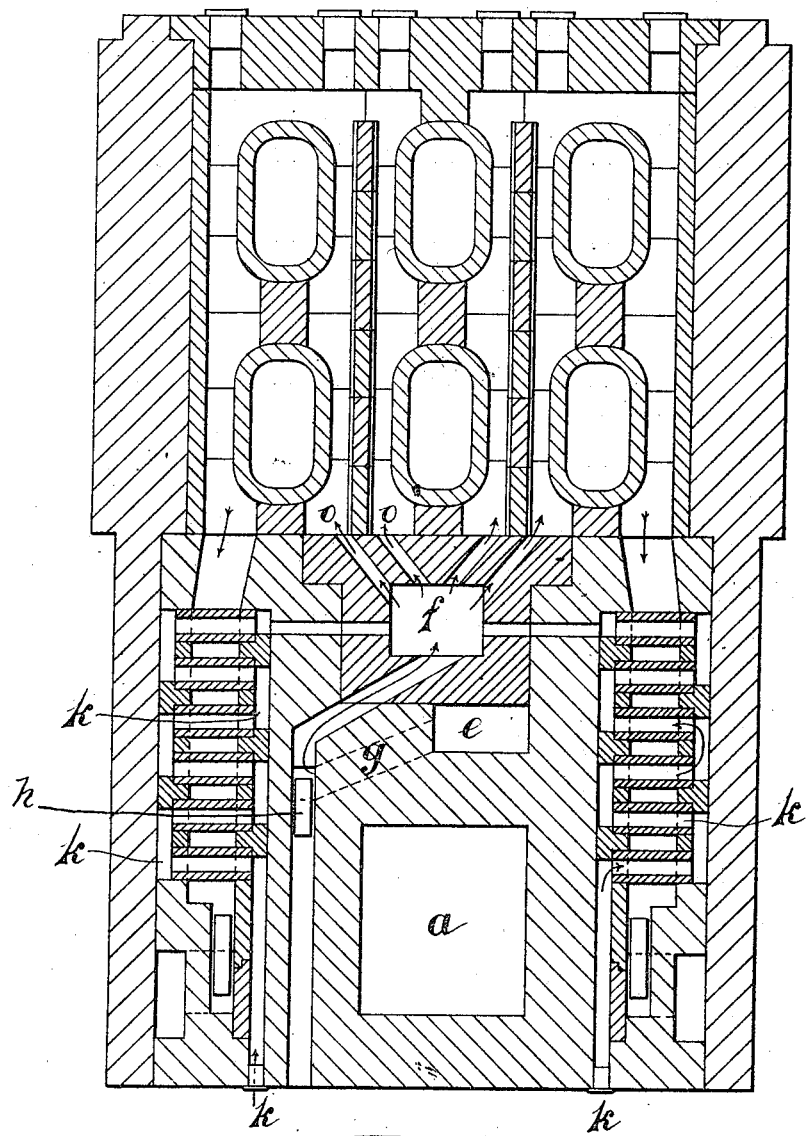
Figure 7:
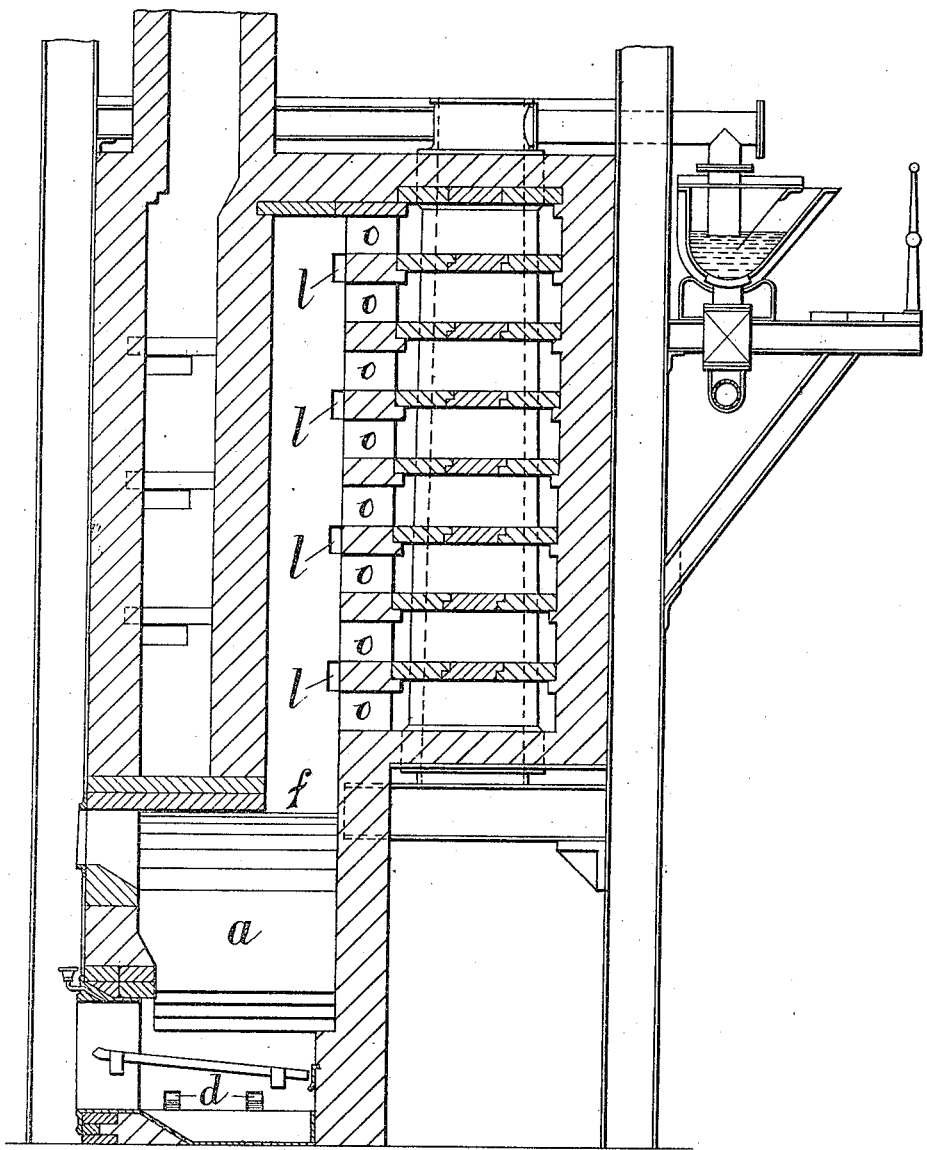
Figure 8:
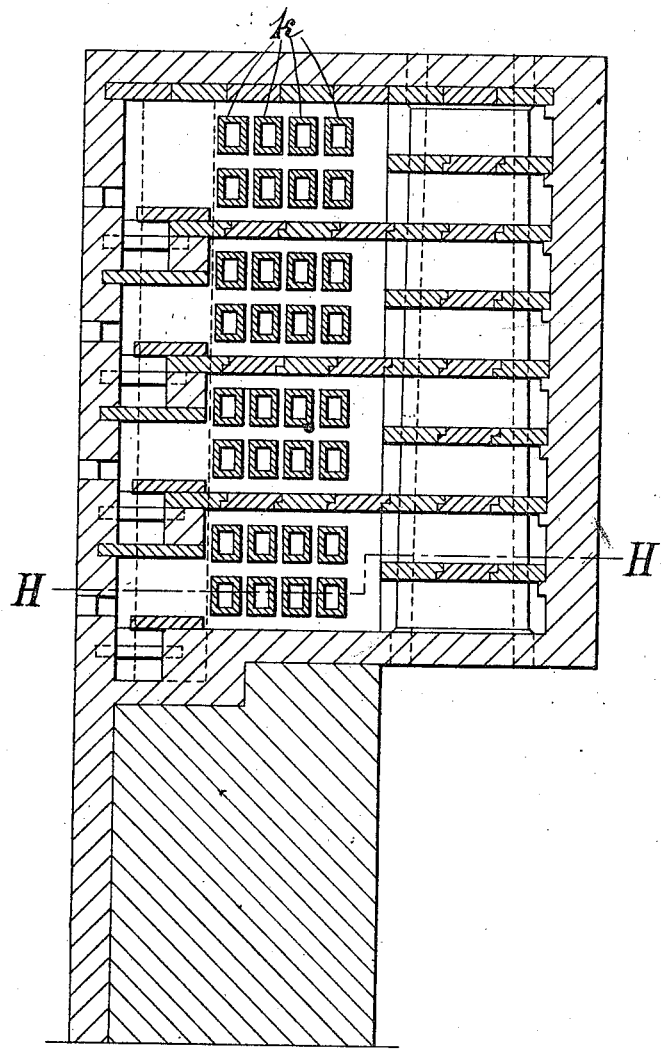
Figure 9:
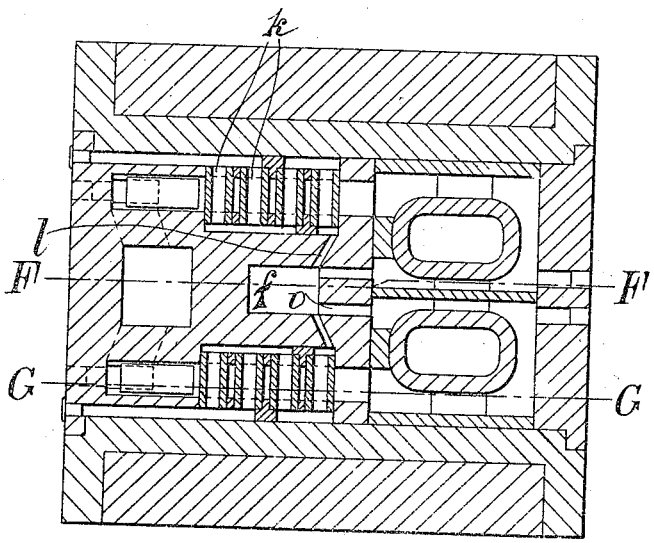

Figure 1 is a half-front elevation. Figs. 2, 3 and 4 are vertical sections taken respectively on the lines A—A, B—B, and C—C in Fig. 5. Fig. 5 is a sectional plan, the left side thereof being taken on the line D—D and the right side on the line E—E in Fig. 4. Fig. 6 is a sectional plan of a bench of 6 retorts. Fig. 7 is a section on the line F—F in Fig. 9. Fig. 8 is a section on the line G—G in Fig. 9. Fig. 9 is a section on the line H—H in Fig. 8.

Referring firstly to Figs. 1 to 5, letter $a$ indicates the furnace, which may be supplied with coke through the opening $b$, and with primary air through the regulating boxes $c$ and openings $d$. The producer gas chamber $e$ communicates with the combustion chamber $f$ through openings $g$ controlled by dampers $h$. The setting is divided vertically into two portions by a wall $i$, into which wall the two central retorts are built, each portion having a separate vertical combustion chamber $f$ so that, if desired, only 4 or 6 retorts might be worked while the remainder were not in use. This arrangement applies to settings of 8 or more retorts, except that in the case of 8 or 12 retorts, for example, none of the retorts need be common to both halves of the setting. Settings of fewer than 8 retorts would not be thus divided, and a single combustion chamber centrally situated and common to all the compartments would therefore suffice, as illustrated in Fig. 6. The secondary air will or may be admitted at each side of the furnace, the amount required for various parts of the combustion chamber being separately controlled by adjustable slides $j$ or in other suitable manner; such air enters the regenerator passages $k$ and passes through the openings $l$ into the combustion chamber $f$ which is provided with baffles $m$ as before mentioned. The ports $l$ and $g$ are so arranged that the gases are ignited at point $n$ (Fig. 5) in the back part of the combustion chamber $f$, the object being that each port $o$ shall better receive its share of the products of combustion; but I do not limit myself to this arrangement of ports.

The setting is shown as being divided by horizontal partitions $p$ into four compartments at each side, each compartment having a separate regenerator; and each compartment may be further sub-divided by one or any number of partitions $v$, which latter partitions act as supports to the retort but do not extend to the regenerator. The number of such compartments and sub-divisions, however, is immaterial to this invention, and will in practice be adapted to the requirements of each particular case.

Referring to Figs. 7, 8 and 9, the furnace $a$ is charged with coke from the ground level, instead of from the top of the bench; the separate producer gas chamber ($e$) may be dispensed with, the producer gas going directly to the combustion chamber $f$; and the waste gases from all the regenerators are collected in one flue immediately over the furnace, passing upward to the chimney. The heat regulating arrangements, enabling even or uneven heating to be obtained at will, are, however, the same in principle in this as in the designs of retort benches previously described.

In the process of gas manufacture in vertical retorts having my improvements applied thereto, the heat applied to each part of the retort can be regulated as desired, so that the carbonization may proceed simultaneously throughout the length of the retort and, owing to the short travel of the streams of heated gases coming from the combustion chamber into the setting, such streams need only have an ordinary carbonizing heat, that is, a lower initial temperature than in the present known forms of settings for vertical retorts. In the case of combustion chambers built at the top or bottom of the setting only, with consequent long travel of heating gases, when a retort is newly charged with a large volume of cold coal, the initial temperature of the streams of heating gases must of necessity be exceedingly high, in order to be able to impart carbonizing heats to retorts throughout their length of travel, and then leave the setting at the required carbonizing heat. Moreover, in practice with long travels of heating gases, the temperature of such a stream of gases, when first coming in contact with a newly charged retort, would probably drop below the carbonizing heat; and in consequence, the carbonization of the coal instead of proceeding simultaneously throughout the length of the retort, would begin at one end and gradually extend over the length of the retort, with consequent waste of time and inefficient results. My retorts not being exposed to such excessive ranges of temperature, will also be found more durable than in the latter case, or in the case of the compartments of the setting being converted into combustion chambers, as has previously been proposed in relation to vertical retorts.

I claim as my invention:—

The combination, with a series of vertical retorts, of a retort setting provided with internal partition walls through which the said retorts project and which form around them a series of horizontal superposed heating-chambers, a combustion chamber formed of a series of compartments which communicate with each other, said compartments being provided with separate outlet passages which connect them with the respective heating-chambers to which they pertain, and said compartments having also separate inlets for gas, and a regenerator formed in sections each waste gas passage in the said regenerator being connected with the outlet of one of the respective heating-chambers and being provided with a separate regulating damper, and each secondary air passage in the said regenerator being connected to one of the compartments in the said combustion chamber.

In testimony whereof I affix my signature, in presence of two witnesses.

REUBEN MITCHELL BROOKE

Witnesses:
ERNEST PRIESTLEY NEWTON,
FREDERICK I. BRIGHT.